United States Patent
Iwata et al.

(10) Patent No.: US 9,868,437 B2
(45) Date of Patent: Jan. 16, 2018

(54) DRIVING FORCE CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Shigetsugu Iwata, Toyota (JP); Atsushi Tabata, Okazaki (JP); Tatsuya Imamura, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/372,570

(22) Filed: Dec. 8, 2016

(65) Prior Publication Data

US 2017/0166191 A1    Jun. 15, 2017

(30) Foreign Application Priority Data

Dec. 10, 2015  (JP) .................................. 2015-241536

(51) Int. Cl.

| | |
|---|---|
| *B60L 9/00* | (2006.01) |
| *B60W 20/20* | (2016.01) |
| *B60K 6/36* | (2007.10) |
| *B60K 6/442* | (2007.10) |
| *B60W 10/02* | (2006.01) |
| *B60W 10/06* | (2006.01) |

(Continued)

(52) U.S. Cl.

CPC ............... *B60W 20/20* (2013.01); *B60K 6/36* (2013.01); *B60K 6/442* (2013.01); *B60W 10/02* (2013.01); *B60W 10/06* (2013.01); *B60W 10/08* (2013.01); *F02B 63/04* (2013.01); *F16H 37/0806* (2013.01); *F16H 37/0833* (2013.01); *F16H 48/10* (2013.01); *B60Y 2200/92* (2013.01); *B60Y 2300/42* (2013.01); *Y10S 903/915* (2013.01)

(58) Field of Classification Search

CPC ...... B60W 20/20; B60W 10/02; B60W 10/06; B60W 10/08; B60K 6/36; B60K 6/442; F02B 63/04; F16H 37/0806; F16H 37/0833; F16H 48/10; B60Y 2300/42; B60Y 2300/92; Y10S 903/915

USPC .............. 701/22; 180/65.2, 65.1, 65.3, 65.4; 318/10, 65

See application file for complete search history.

(56) References Cited

U.S. PATENT DOCUMENTS

| | | | |
|---|---|---|---|
| 6,886,648 B1 * | 5/2005 | Hata ...................... | B60K 6/365 180/65.235 |
| 8,545,353 B2 * | 10/2013 | Boskovitch ............ | B60K 6/442 180/65.275 |

(Continued)

FOREIGN PATENT DOCUMENTS

| | | |
|---|---|---|
| JP | 2011-063136 A | 3/2011 |
| JP | 2012-071699 A | 4/2012 |

*Primary Examiner* — Shardul Patel
(74) *Attorney, Agent, or Firm* — Andrews Kurth Kenyon LLP

(57) ABSTRACT

A driving force control system for a hybrid vehicle is provided to reduce frequency of engagement and disengagement of engagement devices involved in a shifting operation to a hybrid mode. A controller is configured: to determine whether or not the engine is required to be started; to determine an operating mode to be established after starting the engine; to engage at least one of the first engagement device and the second engagement device to achieve the determined operating mode; and to start the engine while engaging said one of the first engagement device and the second engagement device.

6 Claims, 14 Drawing Sheets

(51) Int. Cl.
*B60W 10/08* (2006.01)
*F02B 63/04* (2006.01)
*F16H 37/08* (2006.01)
*F16H 48/10* (2012.01)

(56) References Cited

U.S. PATENT DOCUMENTS

| | | | | |
|---|---|---|---|---|
| 2003/0078134 | A1* | 4/2003 | Kojima | B60K 6/365 |
| | | | | 477/3 |
| 2007/0228822 | A1* | 10/2007 | Hirata | B60K 6/48 |
| | | | | 303/151 |
| 2013/0253743 | A1* | 9/2013 | Maruyama | B60K 6/445 |
| | | | | 701/22 |
| 2014/0129067 | A1* | 5/2014 | Furukawa | B60K 6/442 |
| | | | | 701/22 |
| 2015/0006007 | A1* | 1/2015 | Kitahata | B60K 6/442 |
| | | | | 701/22 |
| 2015/0211620 | A1* | 7/2015 | Matsubara | B60K 6/387 |
| | | | | 475/5 |

* cited by examiner

Fig. 4

|  |  |  |  | B0 | C0 | CS |
|---|---|---|---|---|---|---|
| EV Mode | Forward/Reverse | Single-Motor Mode | MG1 Connected |  |  | (○) |
|  |  |  | MG1 Disconnected |  | ○ |  |
|  |  | Dual-Motor Mode |  | ○ | ○ |  |
| HV Mode | Series | Forward/Reverse |  |  |  | ○ |
|  | Series Parallel | Forward | Variable |  | ○ |  |
|  |  |  | Fixed(Daul-Motor) |  | ○ | ○ |
|  |  | Reverse |  |  | ○ |  |

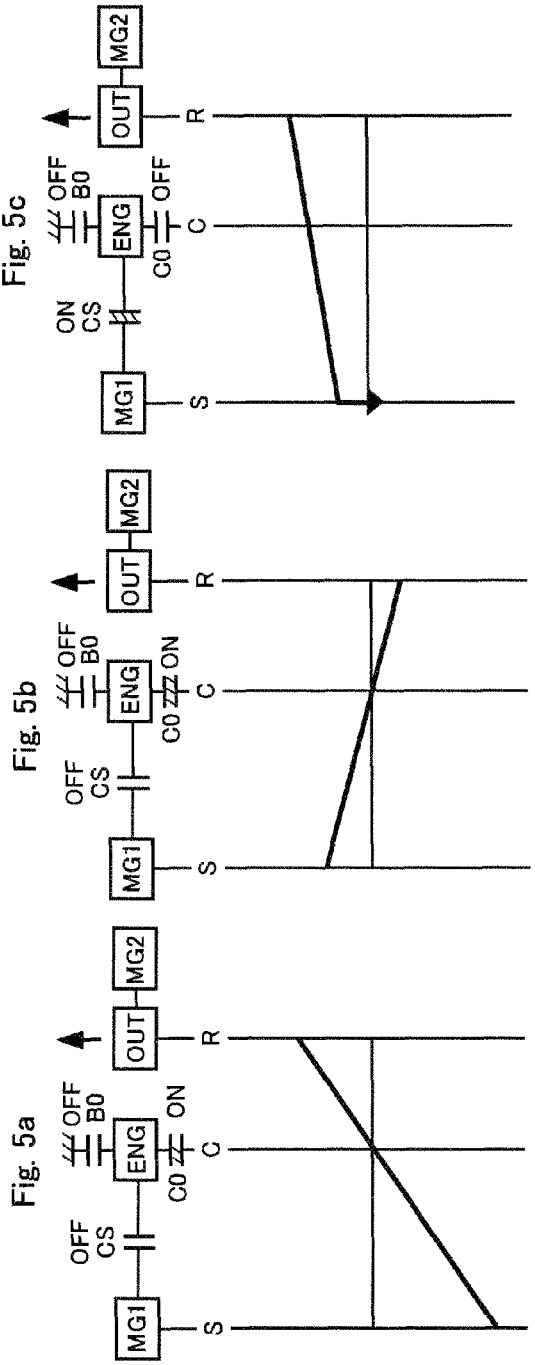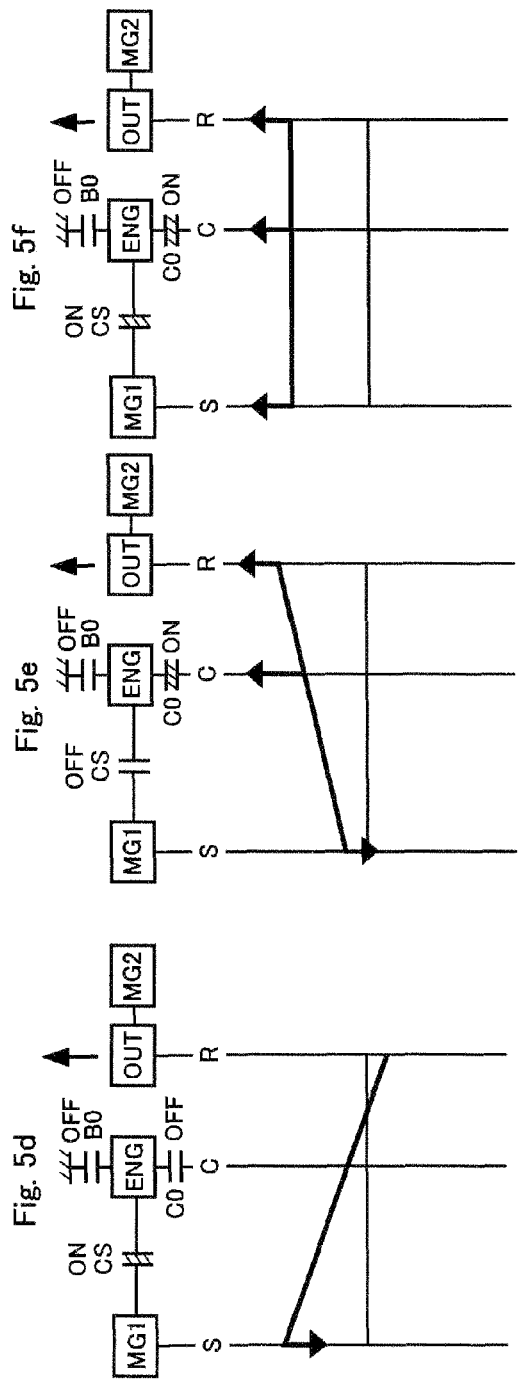

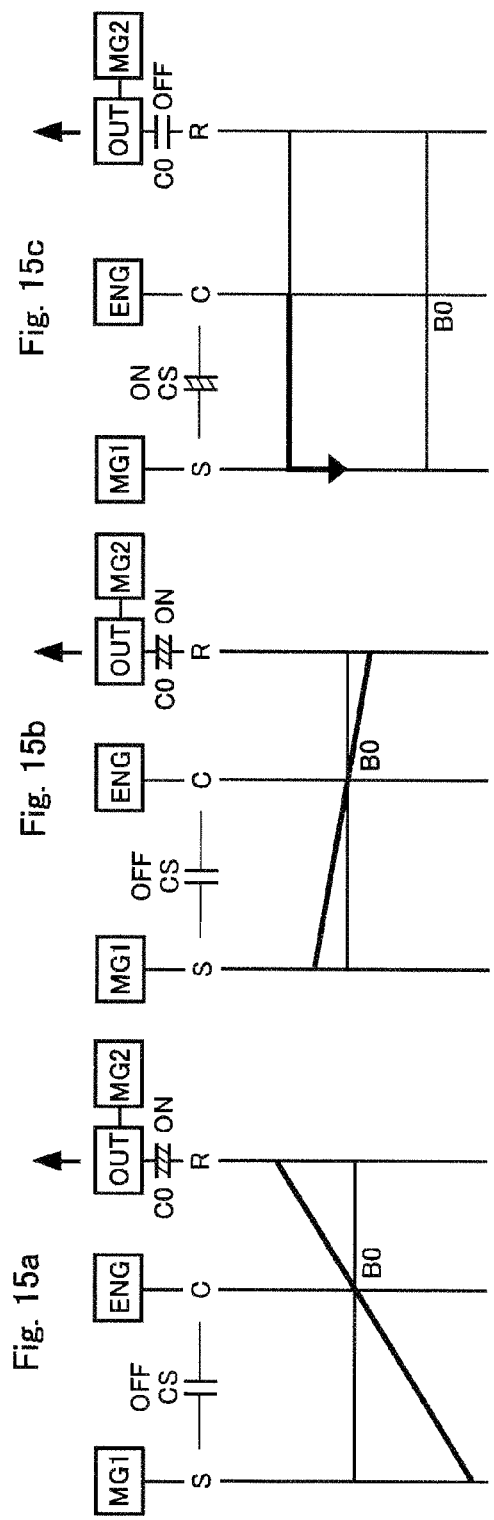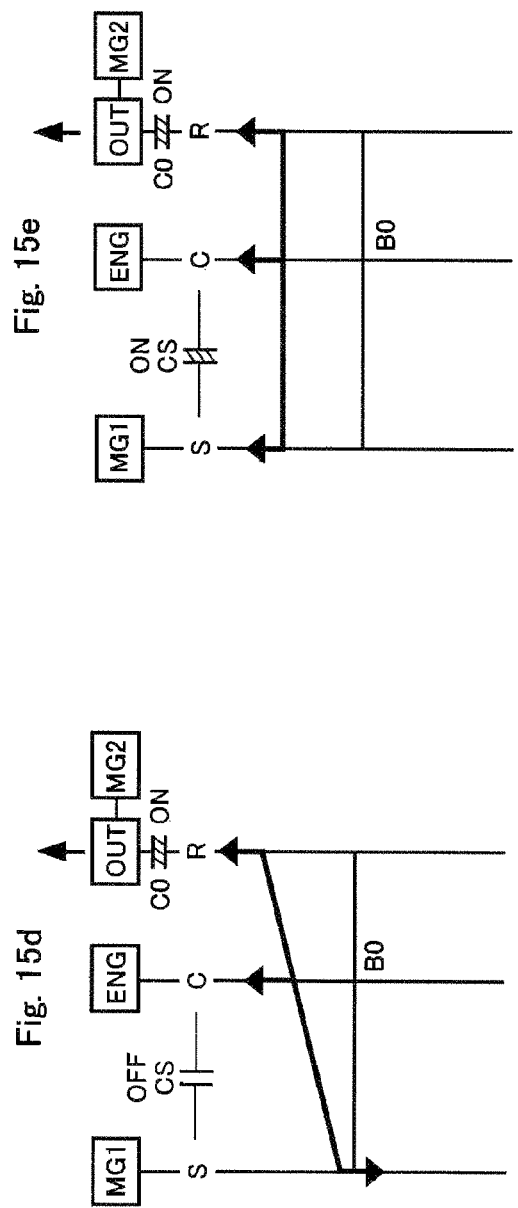

DRIVING FORCE CONTROL SYSTEM FOR HYBRID VEHICLE

CROSS REFERENCE TO RELATED APPLICATIONS

The present application claims the benefit of priority to Japanese Patent Application No. 2015-241536 filed on Dec. 10, 2015 with the Japanese Patent Office, the entire contents of which are incorporated herein by reference in its entirety.

BACKGROUND

Field of the Disclosure

Embodiments of the present application relates to the art of a driving force control system for a hybrid vehicle having an engine and at least two motors for propelling the vehicle.

Discussion of the Related Art

JP-A-2011-063136 describes a driving device for hybrid vehicle. According to the teachings of JP-A-2011-063136, an operating mode of the hybrid vehicle can be selected from: electric vehicle mode in which the vehicle is powered by a motor while stopping an engine; series mode in which the vehicle is powered by the motor activated by an electric power generated by a generator driven by the engine; and series parallel mode in which the vehicle is powered by both of the engine and the motor. Specifically, the operating mode of the hybrid vehicle taught by JP-A-2011-063136 is shifted among the above-mentioned modes by manipulating two clutches and a brake. In addition, JP-A-2012-071699 describes a hybrid vehicle drive control device, and an operating mode of the hybrid vehicle taught by JP-A-2012-071699 may also be selected from the electric vehicle mode, the series mode, and the series parallel mode.

In the hybrid vehicles taught by JP-A-2011-063136 and JP-A-2012-071699, the operating mode is shifted depending on a vehicle speed and an opening degree of an accelerator. For example, in a case of shifting the operating mode of the hybrid vehicle taught by JP-A-2012-071699 from the electric vehicle mode to the hybrid mode such as the series mode or the series parallel mode, the brake is engaged first of all, and then the engine is started by the first motor. Thereafter, the brake is disengaged and the first clutch or the second clutch is engaged.

On the other hand, in a case of shifting the operating mode of the hybrid vehicle taught by JP-A-2012-071699 from the electric vehicle mode to the series parallel mode, the first clutch is disengaged first of all, and then the engine is started by the first motor while engaging the second clutch. Thereafter, the first clutch is engaged and the second clutch is disengaged.

Thus, according to the teachings of JP-A-2011-063136 and JP-A-2012-071699, when the operating mode is shifted to the mode in which the engine is started, the engine is started after manipulating any of the engagement devices, and then manipulating the clutches and the brake to establish the desired mode. However, as a result of engaging and disengaging those engagement elements frequently, engagement shocks may occur frequently.

SUMMARY

Aspects of the present disclosure have been conceived noting the foregoing technical problems, and it is therefore an object of the present application is to provide a driving force control system for a hybrid vehicle that is configured to reduce frequency of engagement and disengagement of a clutch and a brake involved in a shifting operation to an operating mode in which the engine is started.

The driving force control system is applied to a hybrid vehicle comprising: an engine; a first motor having a generating function; a power distribution device that performs a differential action among an input element to which a torque of the engine is applied, a reaction element to which a torque of the first motor is applied, and an output element; an output member to which a torque is delivered from the output element; a first engagement device that selectively allows torque transmission between the engine and the first motor; a second engagement device that selectively allows torque transmission between the engine and the output member through the power distribution device; and a second motor that is activated by an electric power generated by the first motor to generate a drive torque to propel the vehicle. In the hybrid vehicle, an operating mode can be selected at least from: a series mode in which the first engagement device is engaged, the first motor is rotated by the engine to generate electric power, and the second motor is operated by the electric power generate by the first motor to propel the vehicle; and a series parallel mode in which at least the second engagement device is engaged, and the vehicle is powered by the engine and the second motor. In order to achieve the above-explained objective, the driving force control system is provided with a controller that is configured: to control the engine, the first engagement device and the second engagement device; to determine whether or not the engine is required to be started; to determine the operating mode to be established in a case that the engine is required to be started; to engage at least one of the first engagement device and the second engagement device to achieve the determined operating mode; and to start the engine while engaging said one of the first engagement device and the second engagement device.

In a non-limiting embodiment, the controller may be further configured to start the engine while engaging the first engagement device in a case that the operating mode is to be shifted to the series mode after starting the engine.

In a non-limiting embodiment, the controller may be further configured to start the engine while engaging the second engagement device in a case that the operating mode is to be shifted to the series parallel mode after starting the engine.

In a non-limiting embodiment, the driving force control system may further comprises a third engagement device that selectively halt a rotation of an output shaft of the engine. In addition, the operating mode may be further selected from a dual-motor mode in which the vehicle is powered by the first motor and the second motor while engaging the third engagement device.

In a non-limiting embodiment, the third engagement device, the second engagement device, the power distribution device, the first motor and the first engagement device may be arranged in order from the engine side and coaxially with the output shaft of the engine. In addition, the second motor may be arranged in such a manner that a rotor shaft thereof extends parallel to the output shaft of the engine.

In a non-limiting embodiment, a counter shaft extends between and in parallel to the output shaft of the engine and the rotor shaft of the second motor. In addition, a diametrically-larger gear to which torques of the output member and the second motor is applied, and a diametrically-smaller gear that outputs a drive torque are fitted onto the counter shaft.

Thus, according to the embodiment of the present application, the engagement device to be engaged to start the engine is selected based on the operating mode to be established after starting the engine. According to the embodiment, therefore, the engagement devices will not be manipulated after starting the engine. For this reason, frequency of engagement operation and disengagement operation of the engagement devices after starting the engine can be reduced as much as possible when shifting the operating mode from electric vehicle mode to hybrid mode.

For example, the engine is started while engaging the first engagement device in a case that the operating mode is to be shifted to the series mode after starting the engine. According to the embodiment, therefore, frequency of engagement operation and disengagement operation of the engagement devices after starting the engine can be reduced when shifting the operating mode to the series mode.

Likewise, the engine is started while engaging the second engagement device in a case that the operating mode is to be shifted to the series parallel mode after starting the engine. According to the embodiment, therefore, frequency of engagement operation and disengagement operation of the engagement devices after starting the engine can be reduced when shifting the operating mode to the series parallel mode.

BRIEF DESCRIPTION OF THE DRAWINGS

Features, aspects, and advantages of exemplary embodiments of the present disclosure will become better understood with reference to the following description and accompanying drawings, which should not limit the invention in any way.

FIG. 4 is a table showing engagement states of the clutches and the brake in each operating mode;

FIGS. 5a, 5b, 5c, 5d, 5e and 5f show nomographic diagrams indicating status of the power distribution device shown in FIG. 2 in each operating mode;

FIGS. 15a, 15b, 15c, 15d and 15e show nomographic diagrams indicating status of the power distribution device shown in FIG. 11 in each operating mode.

DETAILED DESCRIPTION OF THE PREFERRED EMBODIMENT(S)

Figure 1:
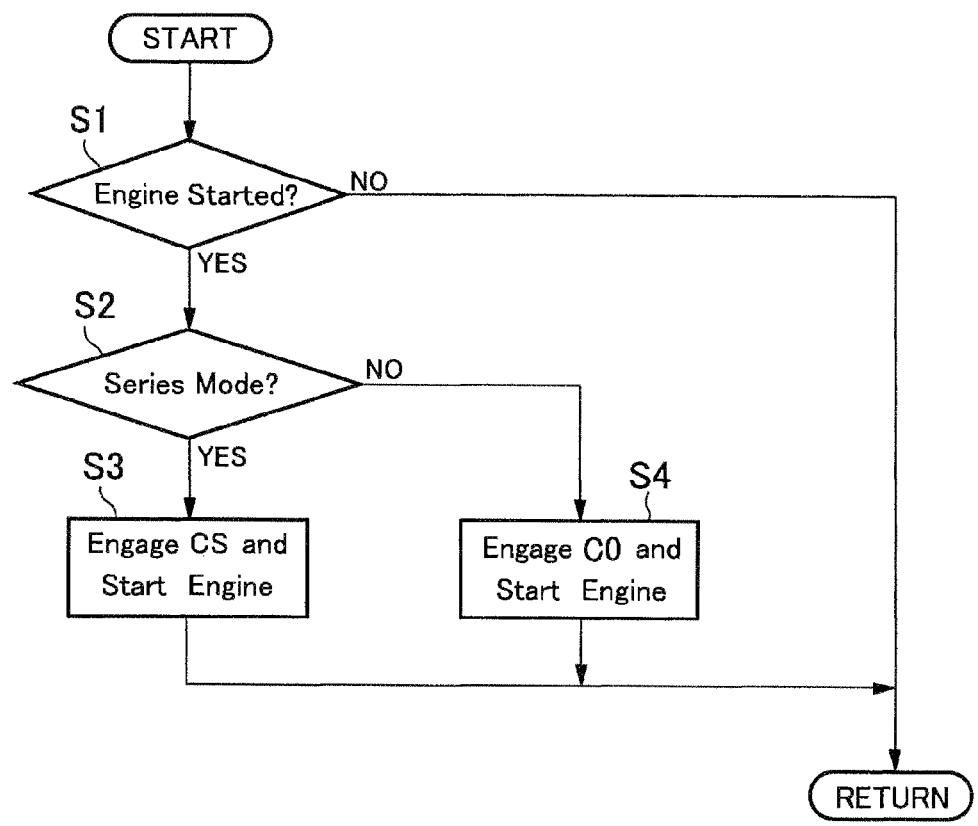
FIG. 1 is a flowchart showing one embodiment of a routine executed when shifting the operating mode to the hybrid mode.

Preferred embodiments of the present application will now be explained with reference to the accompanying drawings. Referring now to FIG. 2, there is shown one example of the front engine-front drive layout hybrid vehicle to which the control system according to the present application is applied. The vehicle shown in FIG. 2 is provided with two motors and an internal combustion engine (as will be simply called the "engine" hereinafter) to power the vehicle, and in the vehicle, a plurality of transmission shafts are arranged parallel to each other. For example, a permanent magnet synchronous motor having a generating function may be used as the motor, and a gasoline engine, an LPG engine or a diesel engine may be used as the engine. Here, it is to be noted that FIG. 1 merely shows connections between components, and actual positions and locations of the components should not be limited to those shown in FIG. 2.

In the vehicle shown in FIG. 2, a power distribution device 3 and a first motor (referred to as "MG1" in FIG. 1) 4 are arranged coaxially with an output shaft (i.e., a crankshaft) 2 of an engine (referred to as "ENG" in FIG. 2) 1. Specifically, the power distribution device 3 is a single-pinion planetary gear unit adapted to perform a differential action comprising a sun gear 5 as a reaction element, a ring gear 6 as an output element arranged concentrically with the sun gear 5, and a carrier 7 as an input element supporting planetary gears interposed between the sun gear 5 and the ring gear 6 in a rotatable manner.

An input shaft 8 extending along a rotational center axis of the power distribution device 3 is connected to the output shaft 2, and an input clutch C0 as a second engagement device is arranged to selectively deliver torque of the engine 1 to drive wheels 23. A rotation of the output shaft 2 connected to the input shaft 8 is selectively halted by a brake B0.

Thus, the first motor 4 is disposed on an opposite side of the engine 1 across the power distribution device 3, and a first rotor shaft 10 as a hollow shaft integral with a first rotor 9 of the first motor 4 is connected to the sun gear 5. An intermediate shaft 11 penetrating through the first rotor shaft 10 while being allowed to rotate relatively with respect to the first rotor shaft 10 is connected to the input shaft 8 to be rotated integrally therewith. The intermediate shaft 11 is selectively connected to the first rotor shaft 10 by a series clutch CS as a first engagement device to selectively deliver an output torque of the engine 1 to the first rotor shaft 9.

The ring gear 6 of the power distribution device 3 is connected to an output gear 12 as an output member to be rotated integrally therewith, and hence the output torque of the engine 1 is delivered to the output gear 12 through the power distribution device 3 by engaging the input clutch C0 while establishing a reaction torque by the first motor 4. Thus, such torque transmission from the engine 1 to the output gear 12 through the power distribution device 3 is selectively achieved by manipulating the input clutch C0.

A countershaft 13 extends parallel to the output shaft 2 of the engine 1, the input shaft 8 and the intermediate shaft 11.

A driven gear 14 as a diametrically-larger gear is fitted onto one end of the countershaft 13 to be meshed with the output gear 12, and a first drive gear 15 as a diametrically-smaller gear is fitted onto the other end of the countershaft 13.

A second motor (referred to as "MG2" in FIG. 2) 16 also having a generating function is disposed parallel to the countershaft 13. A second drive gear 19 is fitted onto a second rotor shaft 18 integral with a second rotor 17 of the second motor 16 to be meshed with the driven gear 14. The second motor 16 is also a permanent magnet synchronous motor having a generating function, and an output torque of the second motor 16 is added to a torque delivered from the output gear 12.

A differential gear unit 20 as a final reduction is disposed parallel to the countershaft 13 and the second motor 16, and a ring gear 21 of the differential gear unit 20 is meshed with the drive gear 15 disposed on the countershaft 13. Powers of the engine 1 and the motors 4 and 16 are distributed to the drive wheels 23 through drive shaft 22.

Thus, in the vehicle shown in FIG. 2, the brake B0, the input clutch C0, the power distribution device 3, the first motor 4 and the series clutch CS are disposed on the output shaft 2 of the engine 1, and the second motor 16 is arranged in such a manner that the second rotor shaft 18 extends parallel to the output shaft 2 of the engine 1. Torques of the output gear 12 and the second motor are synthesized at the driven gear 14 disposed on the counter shaft 13, and further delivered to the drive wheels 23 through the differential gear unit 20 and the drive shafts 22.

The first motor 4 and the second motor 16 are electrically connected with a power source including a battery, a capacitor and an inverter (neither of which are shown). The first motor 4 and the second motor 16 are selectively operated as a motor and a generator by controlling a current supply from the power source, and the second motor 16 can be operated as a motor by an electric power generated by the first motor 4.

Figure 3:
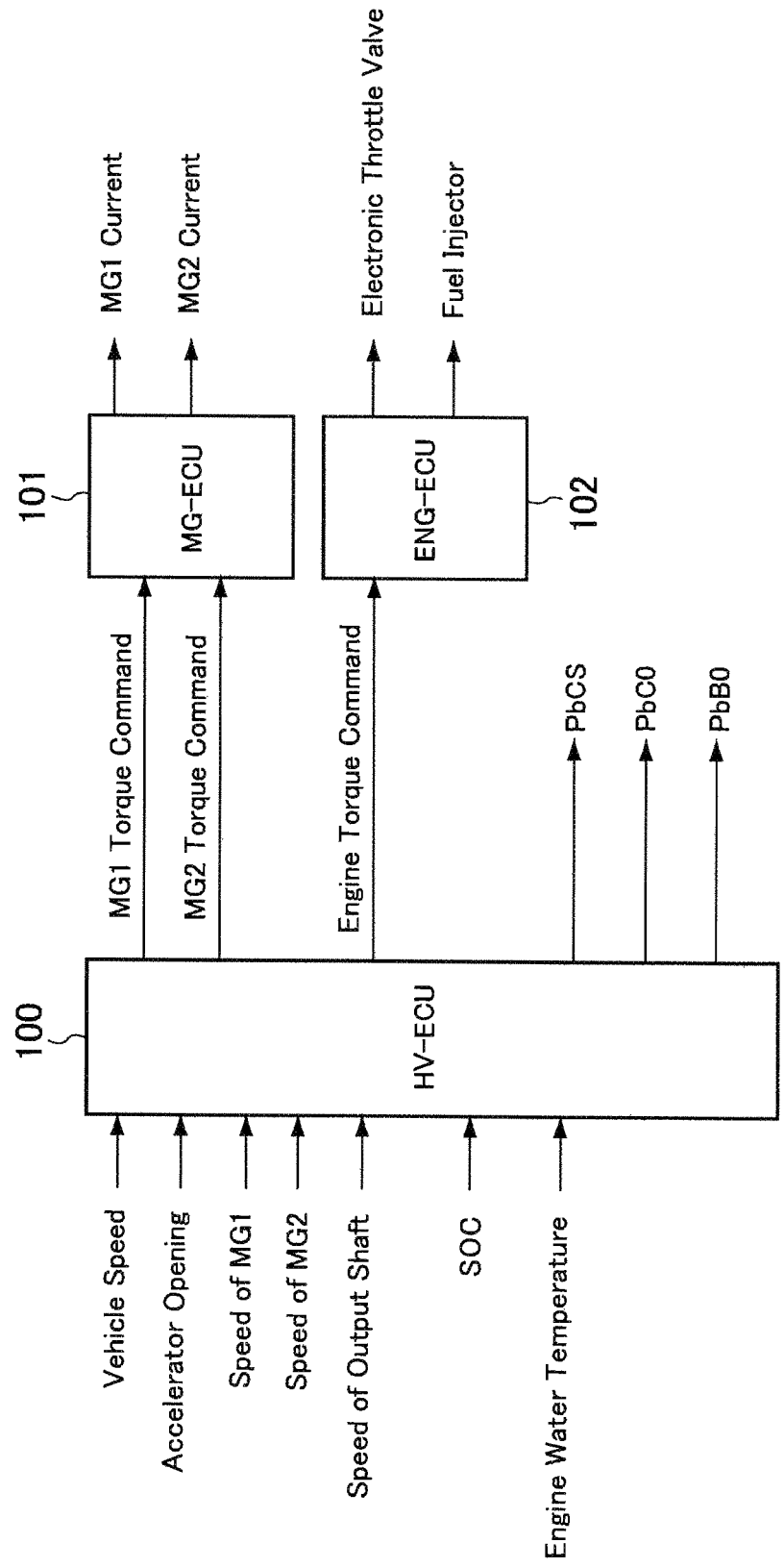
FIG. 3 is a block diagram schematically showing the control system.

An operating mode of the vehicle according to the preferred embodiment can be selected from an electric vehicle mode (abbreviated as the "EV mode" hereinafter) and a hybrid mode (abbreviated as the "HV mode" hereinafter), and the HV mode can be selected from a series mode and a series parallel mode. In order to select the operating mode, and to electrically control the engine 1, the input clutch C0, the series clutch CS and so on, the vehicle is provided with a hybrid control unit (as will be called the "HV-ECU" hereinafter) 100 as a controller. Turning to FIG. 3, there is shown a control system of the vehicle according to the preferred embodiment in more detail. The HV-ECU 100 is composed mainly of a microcomputer configured to carry out a calculation based on incident data, stored data and stored programs, and transmit a calculation result in the form of command signal. To this end, the HV-ECU 100 receives detection signals about a vehicle speed, an opening degree of an accelerator (or a required driving force), a speed of the first motor 4, a speed of the second motor 16, a speed of an output shaft (i.e., a speed of the output gear 12 or the countershaft 13), a state of charge (abbreviated as the "SOC" hereinafter) of the storage device, a temperature of engine water and so on. Torque commands to the first motor 4 and the second motor 16 calculated by the HV-ECU 100 are sent to an after-mentioned motor control unit (as will be called the "MG-ECU" hereinafter) 101 that is also an electronic control unit, and a torque command to the engine 1 calculated by the HV-ECU 100 is sent to an after-mentioned engine control unit (as will be called the "EG-ECU" hereinafter) 102 that is also an electronic control unit. Hydraulic pressures applied to the input clutch C0, the series clutch CS and the brake B0 are controlled by controlling supply current to not shown solenoid valves for controlling the oil delivered to those engagement devices based on hydraulic commands PbCS, PbC0, and PbB0 calculated by the HV-ECU 100.

The MG-ECU 101 and the EG-ECU 102 are also configured to carry out a calculation based on incident data, stored data and stored programs, and transmit a calculation result in the form of command signal. Specifically, the MG-ECU 101 is configured to calculate supply currents to the first motor 4 and the second motor 16 based on the torque commands transmitted from the HV-ECU 100, and to transmit current command signals to the power source 24. The EG-ECU 102 is configured to calculate a target torque of the engine 1, and to transmit command signals to an electronic throttle valve and a fuel injector to control an opening degree of the throttle valve and a fuel injection.

Engagement states of the clutches C0 and CS and the brake B0 in each operating mode are shown in FIG. 4. In FIG. 4, "O" represents an engagement of the engagement device. In the EV mode, the vehicle is propelled by an electric power of the storage device, and the EV mode can be selected from a single-motor mode in which the vehicle is powered at least by the second motor 16, and a dual-motor mode in which the vehicle is powered by both of the first motor 4 and the second motor 16. Further, the single-motor mode can be selected from a disconnecting mode in which the first motor 4 is disconnected from the powertrain in order not to be rotated, and a connecting mode in which the first motor 4 is connected to the second motor 16 and driving wheels 23 to be rotated passively.

In the disconnecting mode, the input clutch C0 and the brake B0 are disengaged and the clutch CS is disengaged according to need while activating the second motor 16 by the electric power from the storage device so that an output torque of the second motor 16 is delivered to the differential unit 20 through the countershaft 13. In this situation, although the output gear 12 is rotated by a rotation of the driven gear 14, the carrier 7 is allowed to rotate freely and hence the engine 1 and the first motor 4 are prevented from being rotated. Nonetheless, if a rotational speed of the first motor 4 is changed, such rotation of the first motor 4 may be halted by the HV-ECU 100, energizing the first motor 4 or utilizing a cogging torque.

By contrast, in the connecting mode, only the input clutch C0 is engaged while activating the second motor 16 by the electric power from the storage device. In this situation, the carrier 7 is connected to the input shaft 8 to be prevented from being rotated so that the sun gear 5 is rotated in the opposite direction (i.e., in the counter direction) together with the first rotor shaft 10 and the first rotor 9 connected thereto. In the connecting mode, an electric energy regenerated by the second motor 16 during deceleration can be stored into the storage device. In addition, an engine braking force can be established during deceleration in the connecting mode by engaging the input clutch C0 to connect the engine 1 to the driving wheels 23 while raising a speed of the engine 1 by the first motor 4.

A status of the power distribution device 3 during forward propulsion in the connecting mode is indicated in a nomographic diagram shown in FIG. 5a, and a status of the power distribution device 3 during reverse propulsion in the connecting mode is indicated in a nomographic diagram shown in FIG. 5b. In FIGS. 5a, 5b, 5c, 5d, 5e and 5f, "ON" and "OFF" individually represents an engagement and a disengagement of the engagement element, and the arrow indicates a direction of the torque.

The dual-motor mode is established by engaging the input clutch C0 and the brake B0. In the dual-motor mode, both of the first motor 4 and the second motor 16 are activated by the electric power supplied from the storage device to propel the vehicle. In this case, the carrier 7 of the power distribution device 3 is halted and hence ring gear 6 and the output gear 12 are rotated in the forward direction to propel the vehicle in the forward direction by rotating the first motor 4 in the counter direction. Consequently, an output torque of the first motor 4 is delivered from the output gear 12 to the differential gear unit 20 through the countershaft 13. In this situation, if the second motor 16 is rotated in the forward direction, an output torque thereof is added to the torque delivered from the output gear 12 at the countershaft 13 so that a total torque of the first motor 4 and the second motor 16 is delivered to the differential gear unit 20. Here, in the EV mode, the vehicle can be propelled in reverse by rotating the second motor 16 in the counter direction, and an operating state of the power distribution device 3 will not be changed in a forward stage and in a reverse stage. In a case of propelling the vehicle in reverse in the dual-motor mode, the first motor 4 is also rotated in the counter direction.

In the HV mode, the series mode is established by engaging only the series clutch CS. FIGS. 5c and 5d show an operating state of the power distribution device 3 under the situation in which the vehicle is propelled in the forward direction in the series mode. In the series mode, an output torque of the engine 1 is delivered to the first motor 4 through the series clutch CS so that the first motor 4 is operated as a generator. In this case, the carrier 7 of the power distribution device 3 is allowed to rotate freely and hence an output torque of the engine 1 is not delivered to the output gear 12. An electric power generated by the first motor 4 is supplied to the second motor 16 to operate the second motor 16 as a motor, and an output torque of the second motor 16 is delivered to the differential gear unit 20 through the countershaft 13 to propel the vehicle. In this situation, as indicated in FIG. 5c, the ring gear 6 is rotated in the forward direction in accordance with the vehicle speed, and the sun gear 5 is rotated at a same speed as the engine 1. Consequently, the carrier 7 is idled at a speed governed by rotational speeds of the ring gear 6 and the sun gear 5 and a gear ratio of the power distribution device 3 (i.e., ratio between teeth number of the sun gear 5 and teeth number of the ring gear 6). In the series mode, a travelling direction of the vehicle can be switched between the forward direction and the backward direction by switching a rotational direction of the second motor 16. Specifically, as indicated in FIG. 5d, the vehicle is propelled in the reverse direction by reducing the speed of the engine 1 while rotating the second motor 16 in the counter direction.

In the series parallel mode, the vehicle is powered by the engine 1, the first motor 4 and the second motor 16. In a case of propelling the vehicle in the forward direction, the series parallel mode may be switched between a variable mode in which a ratio of an engine speed to an output shaft speed (e.g., speed of the output gear 12) can be varied continuously, and a fixed mode in which the power distribution device 3 is rotated integrally.

Specifically, during forward propulsion in the series parallel mode, the variable mode is established by engaging only the input clutch C0. FIG. 5e shows an operating state of the power distribution device 3 in the variable mode. In this case, an output torque of the engine 1 is delivered to the carrier 7 of the power distribution device 3 through the input clutch C0 so that the carrier 7 is rotated in the forward direction. In this situation, the first motor 4 is operated as a generator and hence a negative torque is applied to the sun gear 5. Consequently, the ring gear 6 and the output gear 12 integral therewith are rotated in the forward direction. An electric power generated by the first motor 4 is supplied to the second motor 16 to operate the second motor 16 as a motor, and an output torque of the second motor 16 is added to the torque delivered from the output gear 12 at the countershaft 13. Thus, in the variable mode, power of the engine 1 is partially delivered from the output gear 12 to the differential gear unit 20 through the power distribution device 3, and the remaining power of the engine 1 is once converted into an electric power to activate the second motor 16 and then converted into a drive torque by the second motor 16 to be delivered to the differential gear unit 20. In the variable mode, a speed of the engine 1 can be controlled in an optimally fuel efficient manner by controlling a speed of the first motor 4. In a case of propelling the vehicle in the backward direction in the series parallel mode, only the input clutch C0 is engaged. In this case, the first motor 4 is rotated in the forward direction by the power of the engine 1 to serve as a generator, and the second motor 16 is rotated in the backward direction to serve as a motor.

During forward propulsion in the series parallel mode, the fixed mode is established by engaging the input clutch C0 and the series clutch CS. FIG. 5f shows an operating state of the power distribution device 3 in the fixed mode. In this case, since the input clutch C0 and the series clutch CS are engaged, the carrier 7 is connected to the sun gear 5 so that the power distribution device 3 is rotated integrally. Consequently, an output torque of the engine 1 is delivered to the output gear 12 without being amplified or reduced. In this situation, the first motor 4 is connected to the engine 1 through the power distribution device 3, and hence an output torque of the first motor 4 driven as a motor by the electric power supplied from the storage device can be added to the output torque of the engine 1. Likewise, an output torque of the second motor 16 driven as a motor by the electric power supplied from the storage device may also be added to the output torque of the engine 1.

Figure 6:
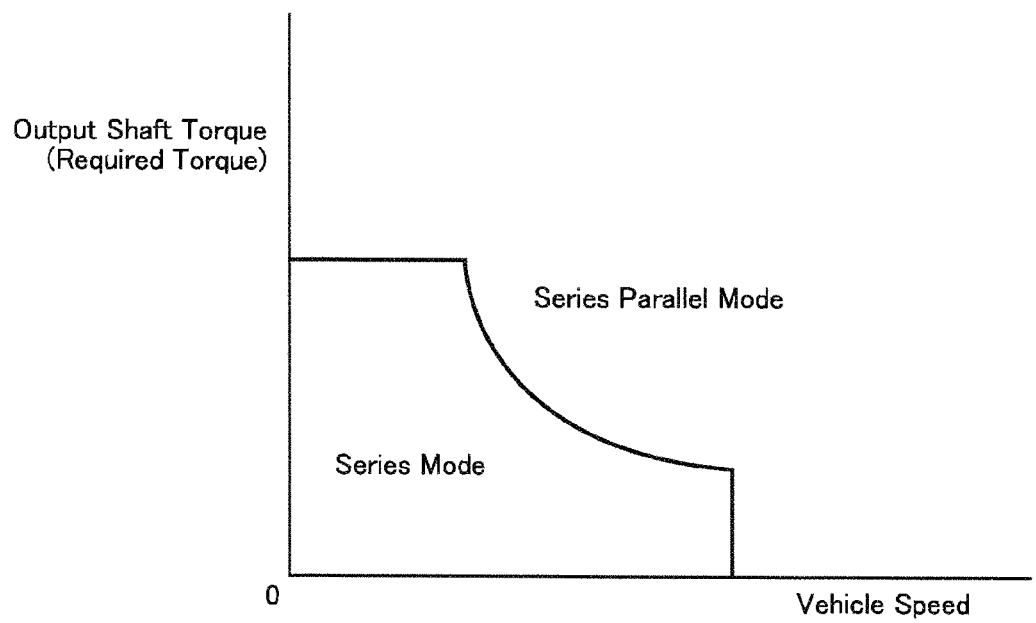
FIG. 6 is a map defining a boundary between the series mode and the series parallel mode based on an output shaft torque and a vehicle speed.

In the EV mode and the series mode, a maximum drive torque is governed by capacities of the first motor 4 and the second motor 16. For example, in the series mode, the maximum drive torque is limited to the maximum torque of the second motor 16, and as shown in FIG. 6, the maximum drive torque is reduced in accordance with an increase in the vehicle speed after the vehicle speed is increased to a certain level. According to the preferred example, therefore, the HV mode is shifted between the series mode and the series parallel mode with reference to the map shown in FIG. 6 defining operating regions of those modes based on the vehicle speed and the output shaft torque (or a required torque).

In the HV mode, when the vehicle speed is low and the required torque is small, the series mode may be shifted to the series mode to save fuel. By contrast, when the vehicle speed is high and the required torque is large, the series parallel mode may be selected to enhance driving performance. For example, the series parallel mode is selected when the sporty mode is selected to keep the engine speed to the higher speed and to establish an engine braking force to decelerate the vehicle.

Figure 7:
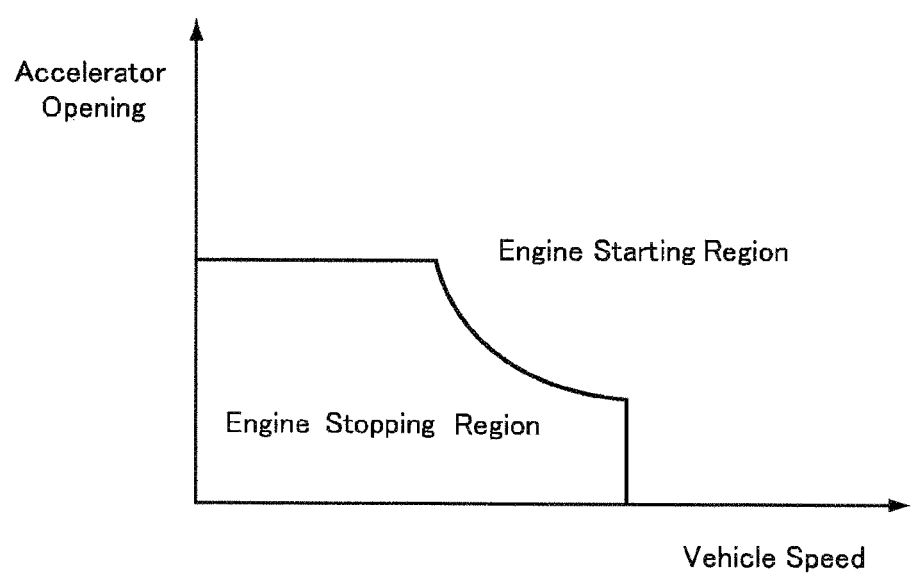
FIG. 7 is a map defining a boundary between the engine stopping region and the engine stopping region based on an output shaft torque and a vehicle speed.

The engine 1 may be started and stopped depending on an opening degree of an accelerator and a vehicle speed with reference to a map shown in FIG. 7. Specifically, the engine 1 is started when an operating point of the vehicle determined based on an opening degree of an accelerator and a vehicle speed enters into the engine starting region, and the engine 1 is stopped when the operating point enters into the engine stopping region. In a case of thus starting the engine 1 with reference to the map shown in FIG. 7, the operating mode is determined with reference to the map shown in FIG. 6.

Figure 2:
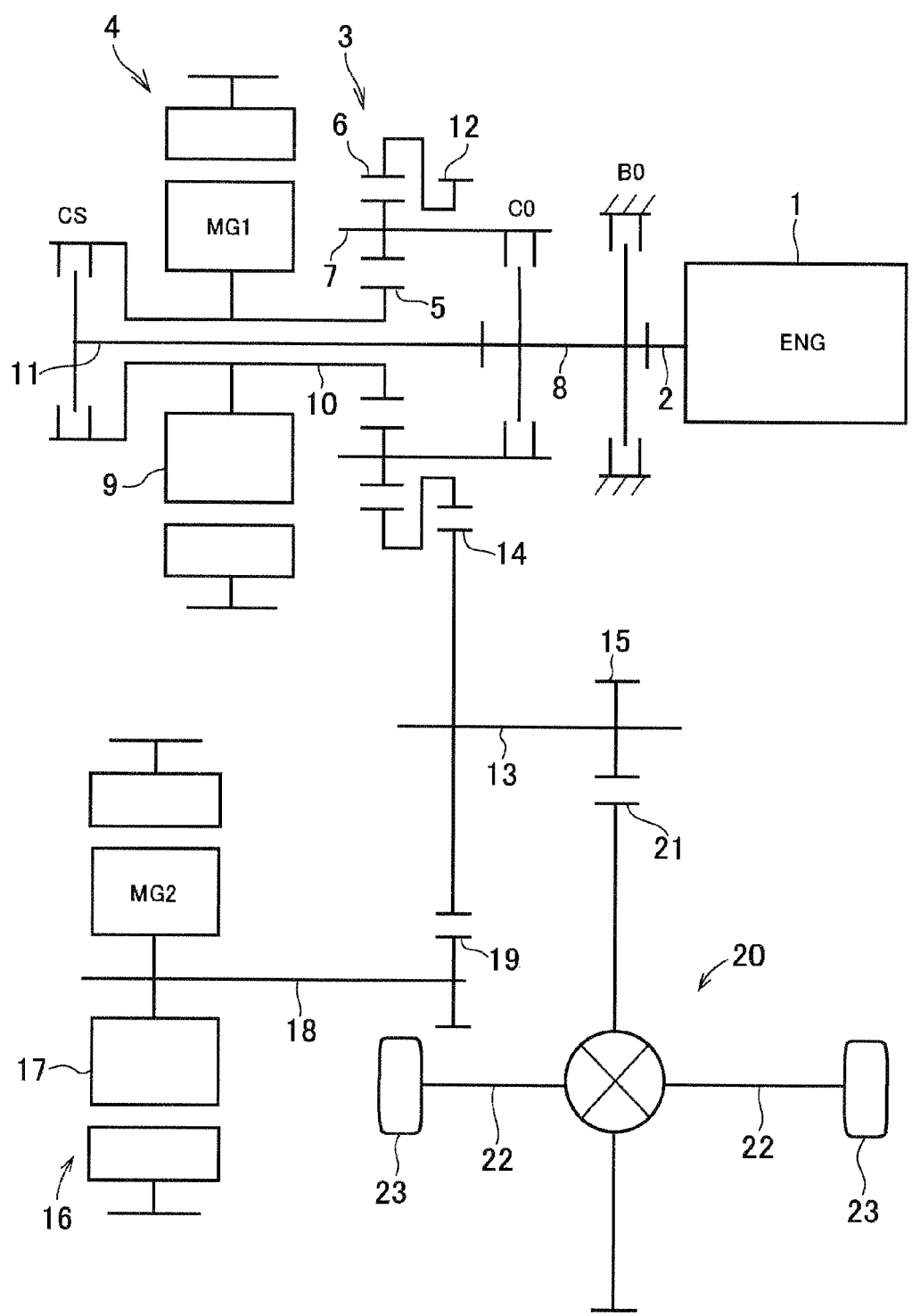
FIG. 2 is a schematic illustration showing one example of the vehicle to which the control system according to the present application is applied.

Turning to FIG. 1, there is shown one example of a routine executed by the HV-ECU 100 when starting the engine 1 in the EV mode.

At step S1, it is determined whether or not the engine 1 is required to be started during propulsion in the EV mode. That is, a transmission of an engine starting demand is determined at step S1. Specifically, such determination at step S1 is made based on a vehicle speed detected by a vehicle speed sensor, an opening degree of the accelerator detected by an opening sensor, an SOC level of the storage device and so on. If it is not necessary to start the engine 1 so that the answer of step S1 is NO, the routine is returned without carrying out any specific control.

By contrast, if the engine 1 is required to be started during propulsion in the EV mode so that the answer of step S1 is YES, the routine progresses to step S2 to determine whether or not the operating mode is to be shifted to the series mode after starting the engine 1. As described, such determination at step S2 is made based on a current required torque and a current vehicle speed with reference to the map shown in FIG. 6.

If the operating mode is to be shifted to the series mode after starting the engine 1 so that the answer of step S2 is YES, the routine progresses to step S3 to start the engine 1 after engaging the series clutch CS while disengaging the brake B0 and the input clutch C0 if the brake B0 and the input clutch C0 are engaged in the current EV mode. In this situation, specifically, a startup of the engine 1 is executed by rotating the crankshaft 2 of the engine 1 by a torque of the first motor 4 delivered through the series clutch CS in engagement. Here, if the current mode is in the disconnecting mode of the EV mode and the series clutch CS is in engagement, the series mode can be started by merely starting the engine 1 without altering engagement states of the input clutch C0, the series clutch CS and the brake B0.

By contrast, if the operating mode will not be shifted to the series mode after starting the engine 1 so that the answer of step S2 is NO, the routine progresses to step S4 to start the engine 1 while keeping the input clutch C0 in engagement if the input clutch C0 is engaged to establish the current EV mode, or to start the engine 1 after engaging the input clutch C0 if the input clutch C0 is disengaged to establish the current EV mode. In this case, the brake B0 is also disengaged before starting the engine 1 if the brake B0 is engaged to establish the current EV mode. In addition, the series clutch CS may be engaged after starting the engine 1 according to need. In this case, the torque of the first motor 4 is delivered to the crankshaft 2 to start the engine 1 through the input clutch C0 in engagement.

Thus, when the operating mode is shifted from the EV mode to the HV mode, the engine 1 is started after engaging the series clutch CS or the input clutch C0 depending on a kind of the HV mode. That is, the input clutch C0, and the brake B0 will not be engaged and disengaged after starting the engine 1, and the series clutch CS is engaged after starting the engine 1 only when shifting to the fixed mode. According to the embodiment, therefore, frequency of engagement operation and disengagement operation of the clutches and the brake after starting the engine 1 can be reduced as much as possible when shifting the operating mode from the EV mode to the HV mode. In addition, since the engagement operation and disengagement operation of the clutches and the brake are executed before starting the engine 1, hydraulic controls for the clutches and the brake can be simplified. Further, a rotational speed of the first motor 4 is not necessary to be controlled before the cranking of the engine 1.

Figure 8:
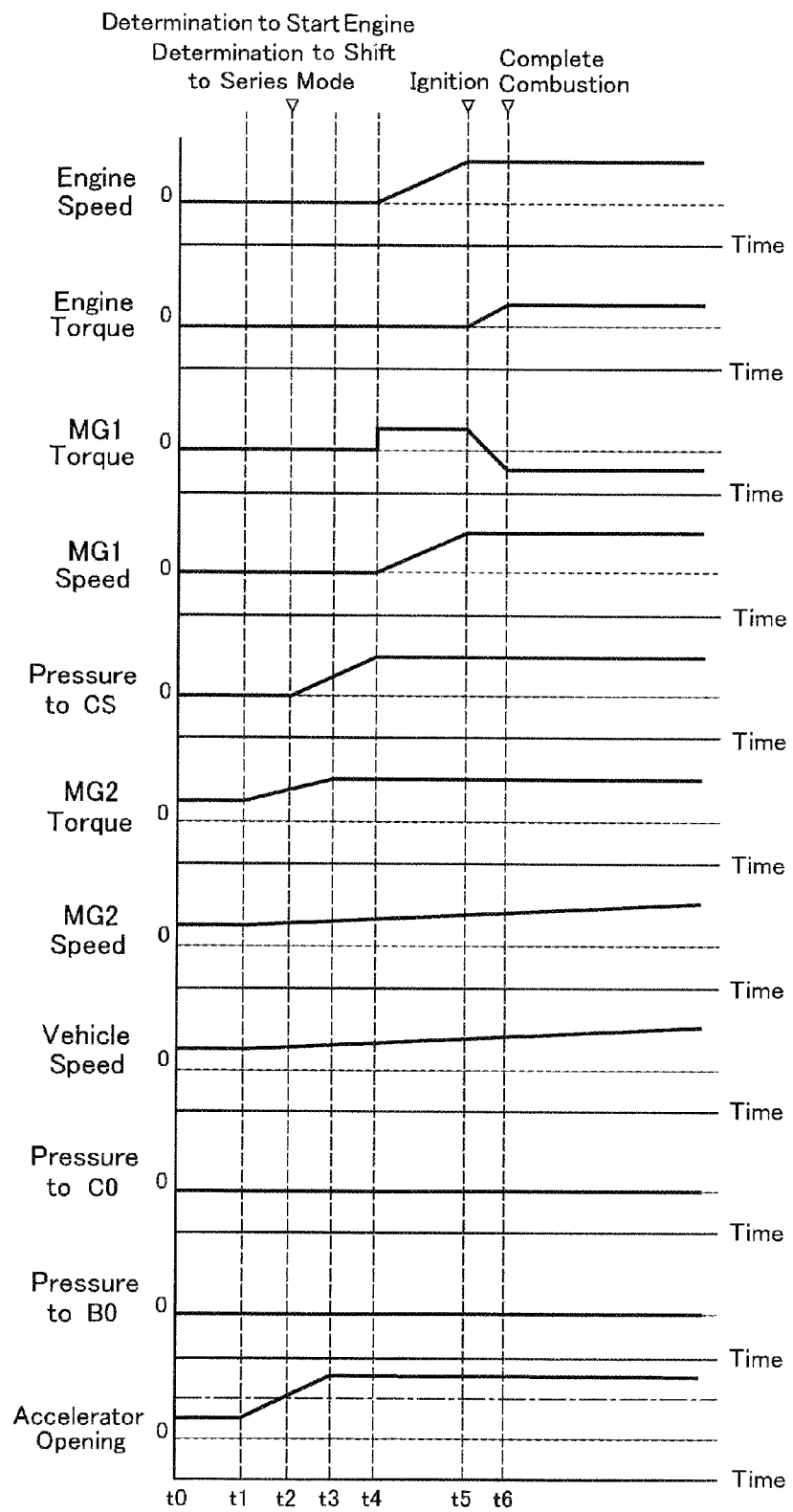
FIG. 8 is a time chart showing temporal changes in the conditions of the vehicle during shifting the operating mode from the disconnecting mode to the series mode.

Temporal changes in the conditions of the vehicle during execution of the routine shown in FIG. 1 are shown in FIGS. 8 to 13. Specifically, FIG. 8 shows temporal changes in output torques of the engine 1 and the motors 4 and 16, and temporal changes in hydraulic pressures applied to the clutches C0 and CS and the brake B0 during shifting the operating mode from the disconnecting mode of the EV mode to the series mode of the HV mode.

At point t0, the vehicle is propelled in the disconnecting mode. In this situation, all of the series clutch CS, the input clutch C0 and the brake B0 are disengaged, and the vehicle is powered by the second motor 16 while stopping the engine 1 and the first motor 4.

At point t1, an accelerator pedal is depressed by the driver to increase an opening degree of the accelerator so that an output torque and a speed of the second motor 16 are increased from point t1. Consequently, a vehicle speed is increased from the point t1. Then, at point t2, the above-explained operating point of the vehicle determined based on the opening degree of the accelerator and the vehicle speed enters into the engine starting region of the map shown in FIG. 7. That is, a determination to start the engine 1 is made at point t2. At point t2, a determination of the operating mode is also made with reference to the map shown in FIG. 6. In this case, specifically a determination to shift the operating mode to the series mode is also made at point t2. At point t2, therefore, a hydraulic pressure applied to the series clutch CS is increased to engage the series clutch CS.

Then, the opening degree of the accelerator is maintained to a constant degree at point t3 so that the output torque of the second motor 16 is maintained constant from point t3. The series clutch CS is brought into complete engagement at point t4 so that the first motor 4 is connected to the engine 1 through the series clutch CS. In this situation, the first motor 4 generates a forward torque to rotate the crankshaft 2 of the engine 1 thereby starting the engine 1. Consequently, a rotational speed of the engine 1 is increased with an increase in a rotational speed of the first motor 4.

When the rotational speed of the engine 1 reaches a self-sustaining speed at point t5, the engine 1 is ignited. Consequently, the engine 1 starts generating a torque and hence the output torque of the first motor 4 is reduced from point t5. Specifically, the output torque of the first motor 4 is gradually reduced and eventually reversed to a counter torque. In this situation, since the output torque of the engine is increased while reducing the forward torque of the first motor 4, the rotational speeds of the engine 1 and the first motor 4 are kept to constant speeds.

Then, the engine 1 is brought into a self-sustaining condition at point t6, that is, a complete combustion of the engine 1 is achieved at point t6. Consequently, the shifting operation to the series mode is completed so that the vehicle is propelled by the output torque of the second motor 16 while generating electricity by rotating the first motor 4 in the counter direction by the output torque of the engine 1. Thus, the engine speed is increased at a predetermined rate from point t1 at which the accelerator pedal is depressed to the point t6 at which the operating mode is shifted to the series mode, and the vehicle speed is increased toward the desired speed in accordance with the opening degree of the accelerator after point t6.

The time chart shown in FIG. 8 indicates the temporal changes in the vehicle conditions of the case in which the series clutch CS was disengaged in the disconnecting mode before shifting to the series mode. However, if the series clutch CS was engaged in the disconnecting mode, the operating mode may be shifted to the series mode by merely starting the engine 1 without engaging and disengaging the input clutch C0, the series clutch CS and the brake B0.

Thus, in the case of shifting the operating mode from the disconnecting mode to the series mode, the series clutch CS is engaged before starting the engine 1 if it is disengaged, and the input clutch C0 and the brake B0 will not be engaged and disengaged after starting the engine 1. In this case, therefore, frequency of engagement operation and disengagement operation of the clutches and the brake after starting the engine 1 can be reduced.

Figure 9:
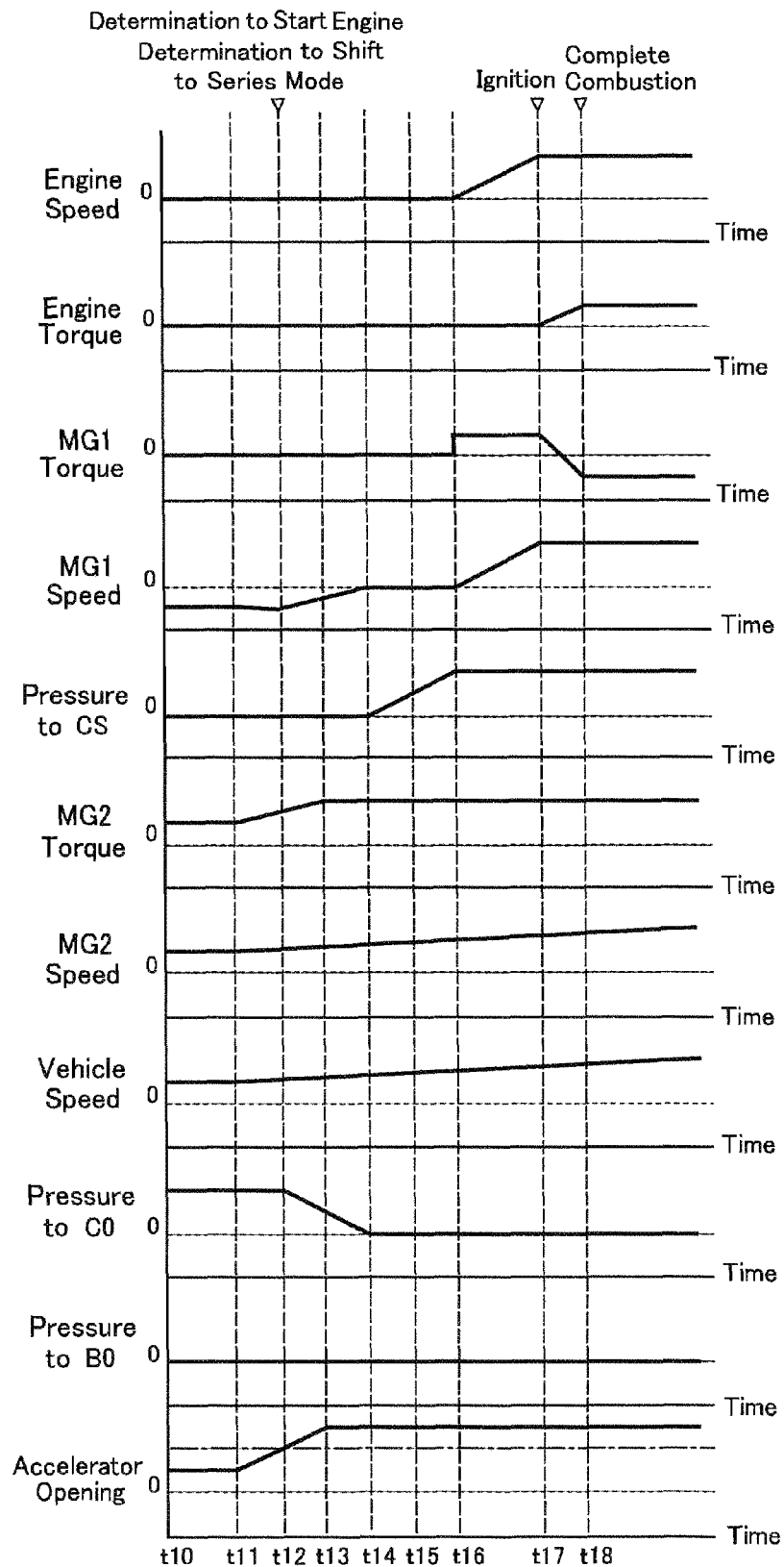
FIG. 9 is a time chart showing temporal changes in the condition of the vehicle during shifting the operating mode from the connecting mode to the series mode.

FIG. 9 shows temporal changes in the conditions of the vehicle during shifting the operating mode from the connecting mode of the EV mode to the series mode of the HV mode by the procedures shown in FIG. 1.

At point t10, the vehicle is propelled in the connecting mode. In this situation, the input clutch C0 is engaged, the series clutch CS and the brake B0 are disengaged, and the vehicle is powered by the second motor 16 while stopping the engine 1. Since the input clutch C0 is in engagement, the carrier 7 serves as a reaction element so that the first motor 4 that is not generating a torque is rotated in the counter direction by a rotation of the ring gear 6 rotated by a torque of the second motor 16.

At point t11, the accelerator pedal is depressed by the driver to increase an opening degree of the accelerator so that an output torque and a speed of the second motor 16 are increased from point t11. In this situation, a speed of the counter rotation of the first motor 4 is increased with an increase in the speed of the second motor 16. Then, at point t12, the above-explained operating point of the vehicle enters into the engine starting region of the map shown in FIG. 7 and hence a determination to start the engine 1 is made at point t12. At point t12, a determination to shift to the series mode is also made with reference to the map shown in FIG. 6.

In this case, the operating mode is shifted from the connecting mode to the series mode by disengaging the input clutch C0 while engaging the series clutch CS. To this end, hydraulic pressure applied to the input clutch C0 is reduced gradually from point t12. Consequently, the carrier 7 gradually loses a function to serve as the reaction element and hence the speed of counter rotation of the first motor 4 is reduced gradually. In this situation, an opening degree of the accelerator is maintained to a constant degree at point t13 so that the output torque of the second motor 16 is maintained constant from point t13. Then, at point t14, the input clutch C0 is brought into disengagement so that the counter rotation of the first motor 4 is stopped.

When the input clutch C0 is disengaged, hydraulic pressure applied to the series clutch CS is increased from the point t14. Consequently, the series clutch CS starts transmitting torque from point t15, and the series clutch CS is brought into complete engagement at point t16. In this situation, the first motor 4 generates a forward torque to rotate the crankshaft 2 of the engine 1 thereby starting the engine 1. When the cranking of the engine 1 is completed at point t17, the engine 1 is ignited and a complete combustion of the engine 1 is achieved at point t18. Consequently, the shifting operation to the series mode is completed.

Thus, in the case of shifting the operating mode from the connecting mode to the series mode, the input clutch C0 is disengaged and the series clutch CS is engaged before starting the engine 1, and the clutches C0 and CS as well as the brake B0 will not be engaged and disengaged after starting the engine 1. In this case, therefore, frequency of engagement operation and disengagement operation of the clutches and the brake after starting the engine 1 may also be reduced.

Figure 10:
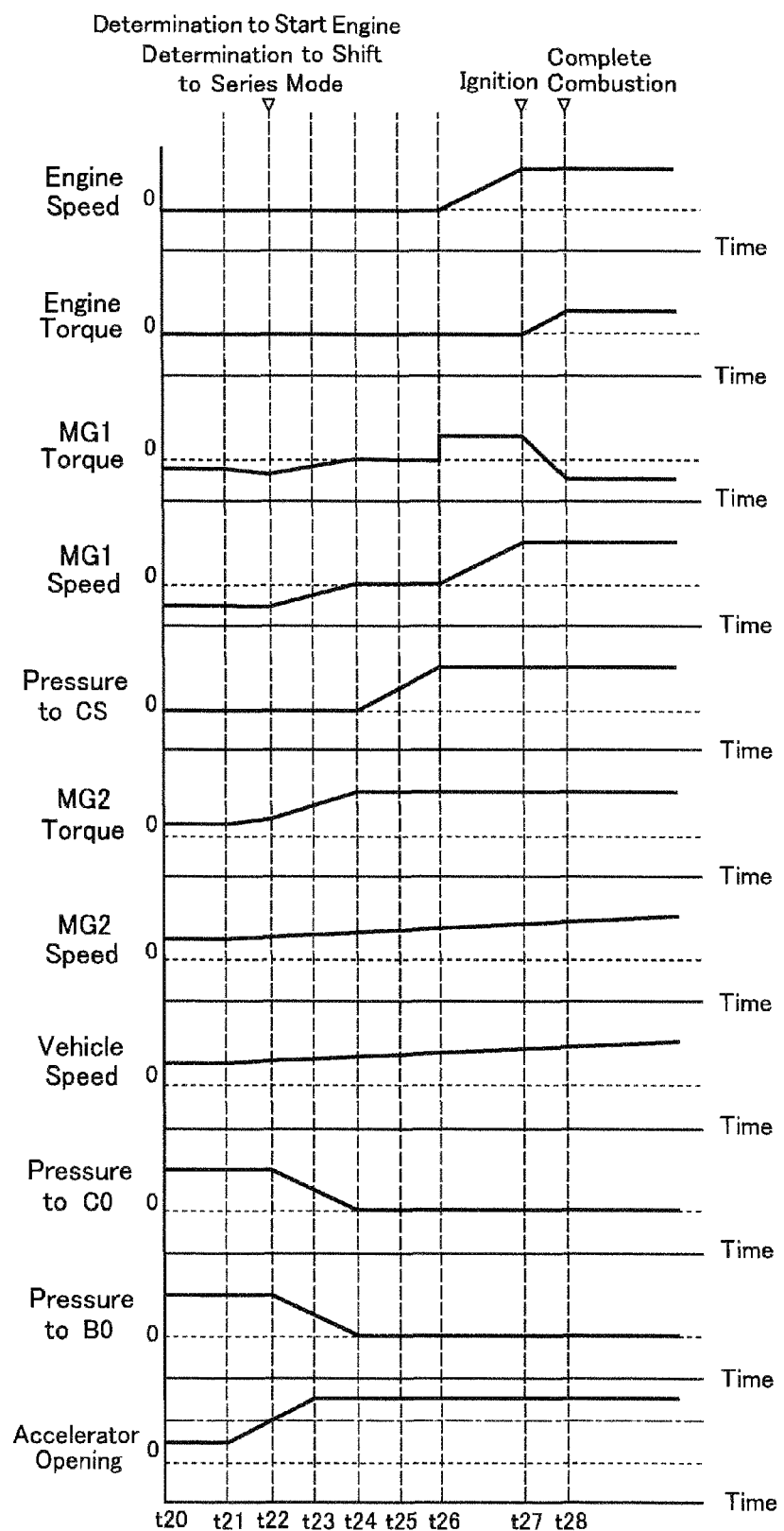
FIG. 10 is a time chart showing temporal changes in the condition of the vehicle during shifting the operating mode from the dual-motor mode to the series mode.

FIG. 10 shows temporal changes in the conditions of the vehicle during shifting the operating mode from the dual-motor mode of the EV mode to the series mode of the HV mode by the procedures shown in FIG. 1.

At point t20, the vehicle is propelled in the dual-motor mode. In this situation, the input clutch C0 and the brake B0 are engaged, the series clutch CS is disengaged, and the vehicle is powered by both of the first motor 4 and the second motor 16 while stopping the engine 1. Since both of the input clutch C0 and the brake B0 are engaged, in the dual-motor mode, the vehicle is propelled by a total torque of the counter torque of the first motor 4 and the forward torque of the second motor 16 delivered to the drive wheels 23 through the input clutch C0 and the brake B0.

At point t21, the accelerator pedal is depressed by the driver to increase an opening degree of the accelerator so that the counter torque of the first motor 4 and the forward torque of the second motor 16 are increased from point t21. Then, at point t22, the above-explained operating point of the vehicle enters into the engine starting region of the map shown in FIG. 7 and hence a determination to start the engine 1 is made at point t22. At point t22, a determination to shift to the series mode is also made with reference to the map shown in FIG. 6.

In this case, the operating mode is shifted from the dual-motor mode to the series mode by disengaging the input clutch C0 and the brake B0 while engaging the series clutch CS. To this end, hydraulic pressures applied to the input clutch C0 and the brake B0 are reduced gradually from point t22, and the counter torque of the first motor 4 is also reduced from point t4. Consequently, the speed of the first motor 4 is reduced gradually.

In this situation, although an opening degree of the accelerator is maintained to a constant degree at point t23, the output torque of the second motor 16 is still increased until point t24 to compensate reduction in the output torque of the first motor 4 so as to maintain the drive force and the vehicle speed. When the input clutch C0 and the brake B0 are brought into complete disengagement at point t24, the first motor 4 is stopped.

When the input clutch C0 and the brake B0 are thus disengaged, hydraulic pressure applied to the series clutch CS is increased from the point t24. Consequently, the series clutch CS starts transmitting torque from point t25, and the series clutch CS is brought into complete engagement at point t26. In this situation, the first motor 4 generates a forward torque to rotate the crankshaft 2 of the engine 1 thereby starting the engine 1. When the cranking of the engine 1 is completed at point t27, the engine 1 is ignited, and the output torque of the first motor 4 is reversed before a complete combustion of the engine 1 is achieved at point t28. Consequently, the engine 1 is brought into the self-sustaining condition and the shifting operation to the series mode is completed.

Thus, in the case of shifting the operating mode from the dual-motor mode to the series mode, the input clutch C0 and the brake B0 are disengaged and the series clutch CS is engaged before starting the engine 1, and the clutches C0 and CS as well as the brake B0 will not be engaged and disengaged after starting the engine 1. In this case, therefore, frequency of engagement operation and disengagement operation of the clutches and the brake after starting the engine 1 may also be reduced.

Figure 11:
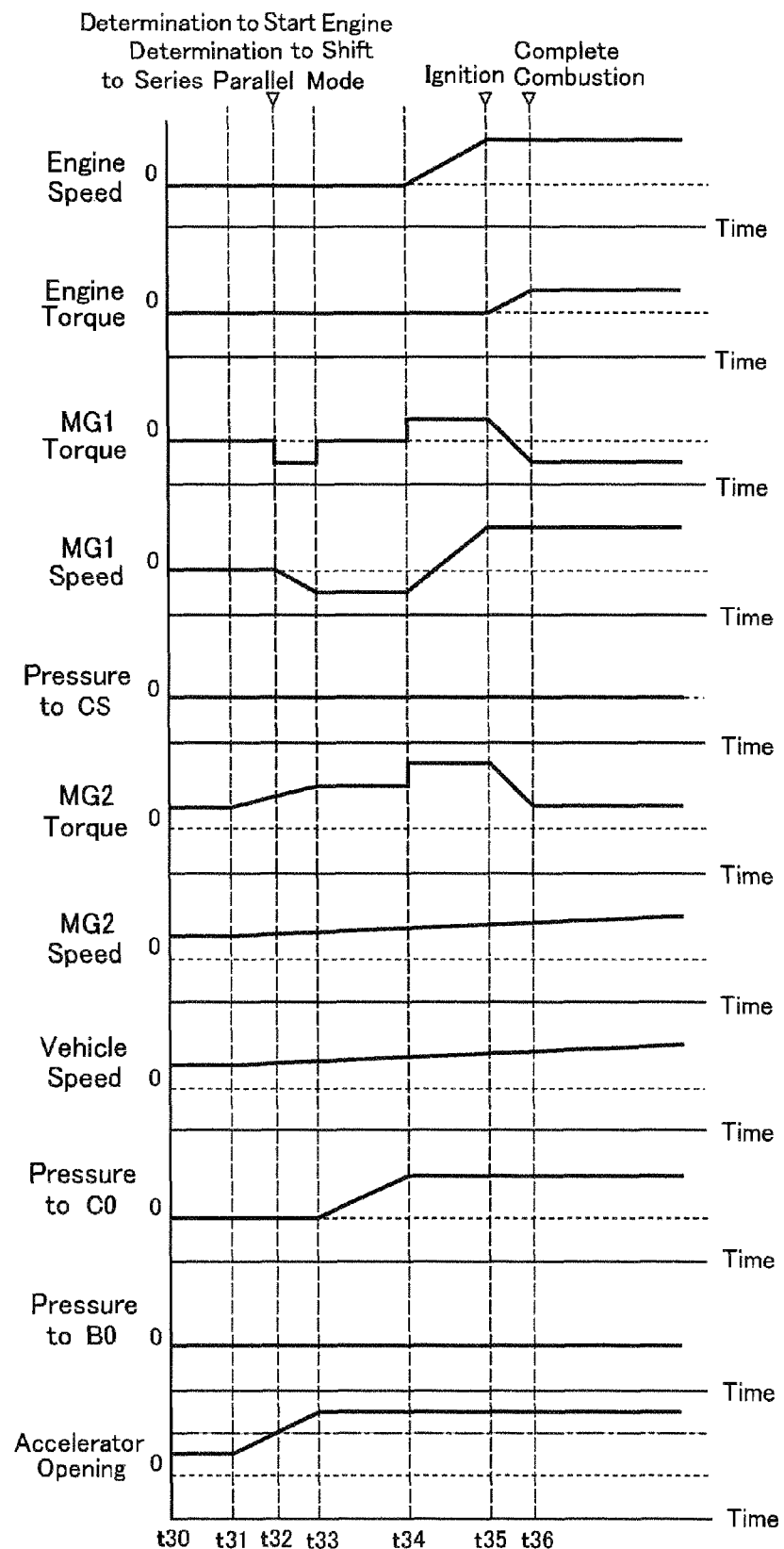
FIG. 11 is a time chart showing temporal changes in the condition of the vehicle during shifting the operating mode from the disconnecting mode to the series parallel mode.

FIG. 11 shows temporal changes in the conditions of the vehicle during shifting the operating mode from the disconnecting mode of the EV mode to the variable mode of the series parallel mode by the procedures shown in FIG. 1.

At point t30, the vehicle is propelled in the disconnecting mode. In this situation, all of the series clutch CS, the input clutch C0 and the brake B0 are disengaged, and the vehicle is powered by the second motor 16 while stopping the engine 1 and the first motor 4. At point t31, the accelerator pedal is depressed by the driver to increase an opening degree of the accelerator so that an output torque and a speed of the second motor 16 are increased from point t31. Consequently, a vehicle speed is increased from the point t31. Then, at point t32, the above-explained operating point of the vehicle enters into the engine starting region of the map shown in FIG. 7 and hence a determination to start the engine 1 is made at point t32. At point t32, a determination to shift to the series parallel mode is also made with reference to the map shown in FIG. 6.

In order to startup the engine 1, first of all, the first motor 4 generates a counter torque and hence the first motor 4 starts rotating in the counter direction from point t32. Consequently, the sun gear 5 is rotated by the counter torque of the first motor 4 so that the carrier 7 being idled by the forward torque of the second motor 16 is stopped. In this situation, since the rotation of the carrier 7 is thus stopped, the input clutch C0 is allowed to be engaged smoothly. The rotational speed of the first motor 4 is increased in the counter direction until point t33, and hydraulic pressure applied to the input clutch C0 is increased from point t33 to engage the input clutch C0. Meanwhile, the opening degree of the accelerator is maintained to a constant degree from point t33 so that the output torque of the second motor 16 is maintained constant from point t33. On the other hand, the counter torque of the first motor 4 is reduced to zero at point t33.

The hydraulic pressure applied to the input clutch C0 is increased gradually so that the series clutch CS is brought into complete engagement at point t34, and the first motor 4 starts generating a forward torque at point t34 to start the engine 1 by applying the torque to the crankshaft 2 through the input clutch C0 and the power distribution device 3. Since the first motor 4 thus generates the forward torque while engaging the input clutch C0, the forward torque of the first motor 4 acts as a braking force. In this situation, therefore, the forward torque of the second motor 16 is increased to maintain the vehicle speed, and a rotational direction of the first motor 4 is revered to the forward direction as a result of thus generating the forward torque.

When the startup of the engine 1 is completed at point t35, the engine 1 is ignited and starts generating a torque. In this situation, the output torque of the first motor 4 is gradually reduced so that a braking force of the first motor 4 is reduced, and eventually reversed to a counter torque. Meanwhile, the output torque of the second motor 16 is reduced from point t35. However, since the input clutch C0 is in engagement, the rotational direction of the first motor 4 is maintained to the forward direction by the output torques of the engine 1 and the second motor 16.

Then, a complete combustion of the engine 1 is achieved at point t36 and the shifting operation to the series parallel mode in which only the input clutch C0 is in engagement is completed. In this situation, the vehicle is propelled by a part of the output torque of the engine 1 and the forward torque of the second motor 16, while generating electricity by applying the remaining output torque of the engine 1 to the first motor 4 generating the counter torque.

The time chart shown in FIG. 11 indicates the temporal changes in the vehicle conditions of the case in which the series clutch CS was disengaged in the disconnecting mode before shifting to the series mode. However, if the series clutch CS was engaged in the disconnecting mode, the operating mode may be shifted to the variable mode by disengaging the series clutch C0 while engaging the input clutch C0, and then the engine 1 is started.

Thus, in the case of shifting the operating mode from the disconnecting mode to the variable mode, the series clutch CS is disengaged if it is engaged while engaging the input clutch C0 before starting the engine 1, and the input clutch C0 and the brake B0 will not be engaged and disengaged after starting the engine 1. In this case, therefore, frequency of engagement operation and disengagement operation of the clutches and the brake after starting the engine 1 can be reduced.

Figure 12:
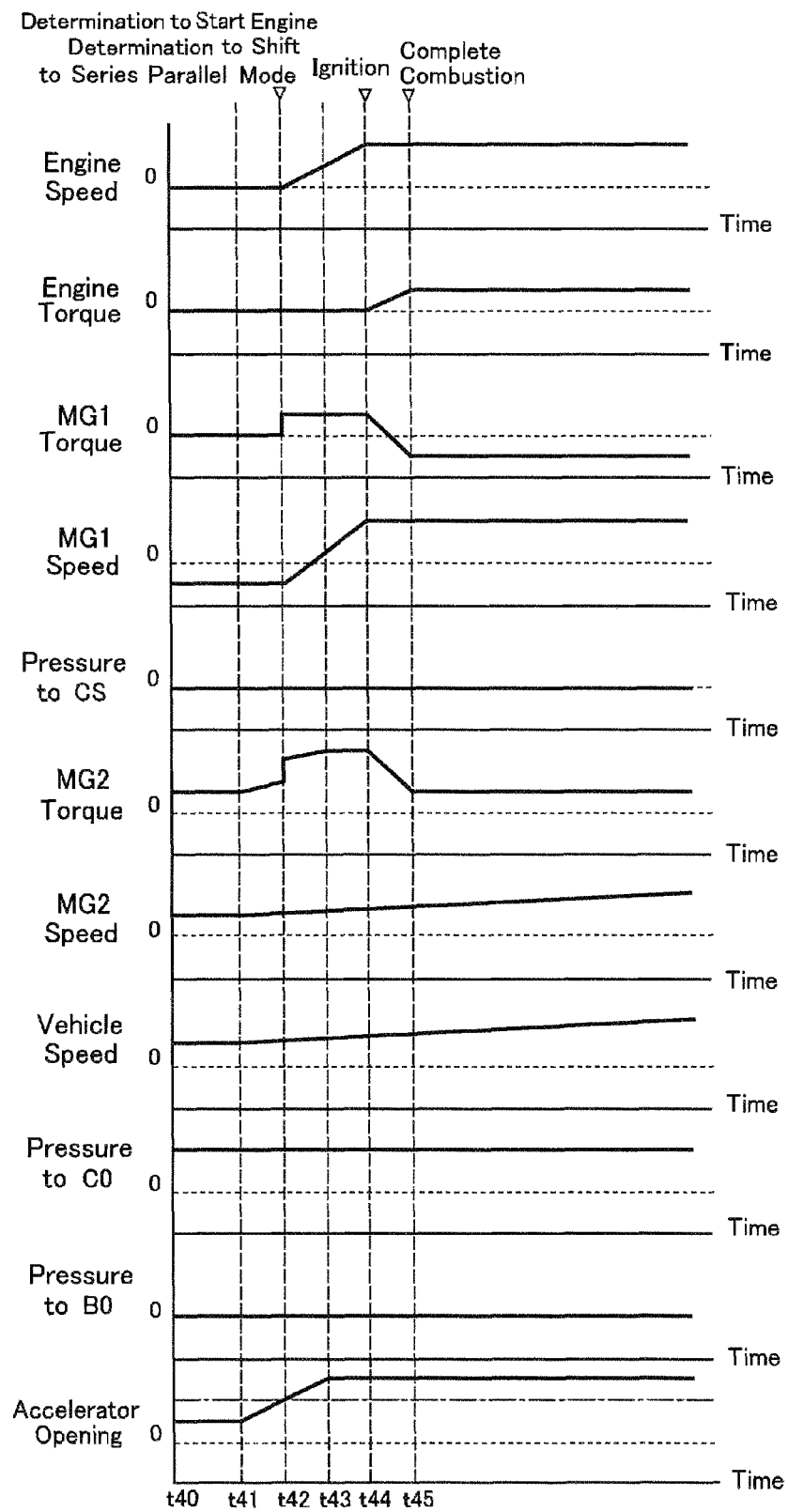
FIG. 12 is a time chart showing temporal changes in the condition of the vehicle during shifting the operating mode from the connecting mode to the series parallel mode.

FIG. 12 shows temporal changes in the conditions of the vehicle during shifting the operating mode from the connecting mode of the EV mode to the variable mode of the series parallel mode by the procedures shown in FIG. 1.

At point t40, the vehicle is propelled in the connecting mode. In this situation, the input clutch C0 is engaged, the series clutch CS and the brake B0 are disengaged, and the vehicle is powered by the second motor 16 while stopping the engine 1 and the first motor 4.

At point t41, the accelerator pedal is depressed by the driver to increase an opening degree of the accelerator so that an output torque and a speed of the second motor 16 are increased from point t41. Consequently, a vehicle speed is also increased from point t41. Then, at point t42, the above-explained operating point of the vehicle enters into the engine starting region of the map shown in FIG. 7 and hence a determination to start the engine 1 is made at point t42. At point t42, a determination to shift to the series parallel mode is also made with reference to the map shown in FIG. 6.

In this case, since the input clutch C0 has already been engaged to establish the disconnecting mode, the operating mode can be shifted to the variable mode by merely starting the engine 1 without manipulating the input clutch C0, the series clutch CS and the brake B0. To this end, the first motor 4 generates a forward torque at point t42 to rotate the crankshaft 2 of the engine 1 thereby starting the engine 1. In this situation, since the input clutch C0 is in engagement, the forward torque of the first motor 4 acts as a braking force. Meanwhile, an opening degree of the accelerator is still being increased at point t42 so that the output torque of the second motor 16 is increased thereby increasing the vehicle speed. Then, the output torque of the second motor 16 is maintained constant from point t43 at which the opening degree of the accelerator is maintained to a constant degree. In this situation, a rotational direction of the first motor 4 is revered to the forward direction as a result of thus generating the forward torque.

When the startup of the engine 1 is completed at point t44, the engine 1 is ignited. As described, when the engine 1 is ignited, the output torque of the first motor 4 is gradually reduced to be reversed to a counter torque and the output torque of the second motor 16 is reduced gradually until a complete combustion of the engine 1 is achieved at point t45. Consequently, the shifting operation to the series parallel mode is completed.

Thus, in the case of shifting the operating mode from the connecting mode to the variable mode, the operating mode can be shifted to the variable mode by merely starting the engine 1 without manipulating the input clutch C0, the series clutch CS and the brake B0. In this case, therefore, frequency of engagement operation and disengagement operation of the clutches and the brake to shift the operating mode can be reduced.

Figure 13:
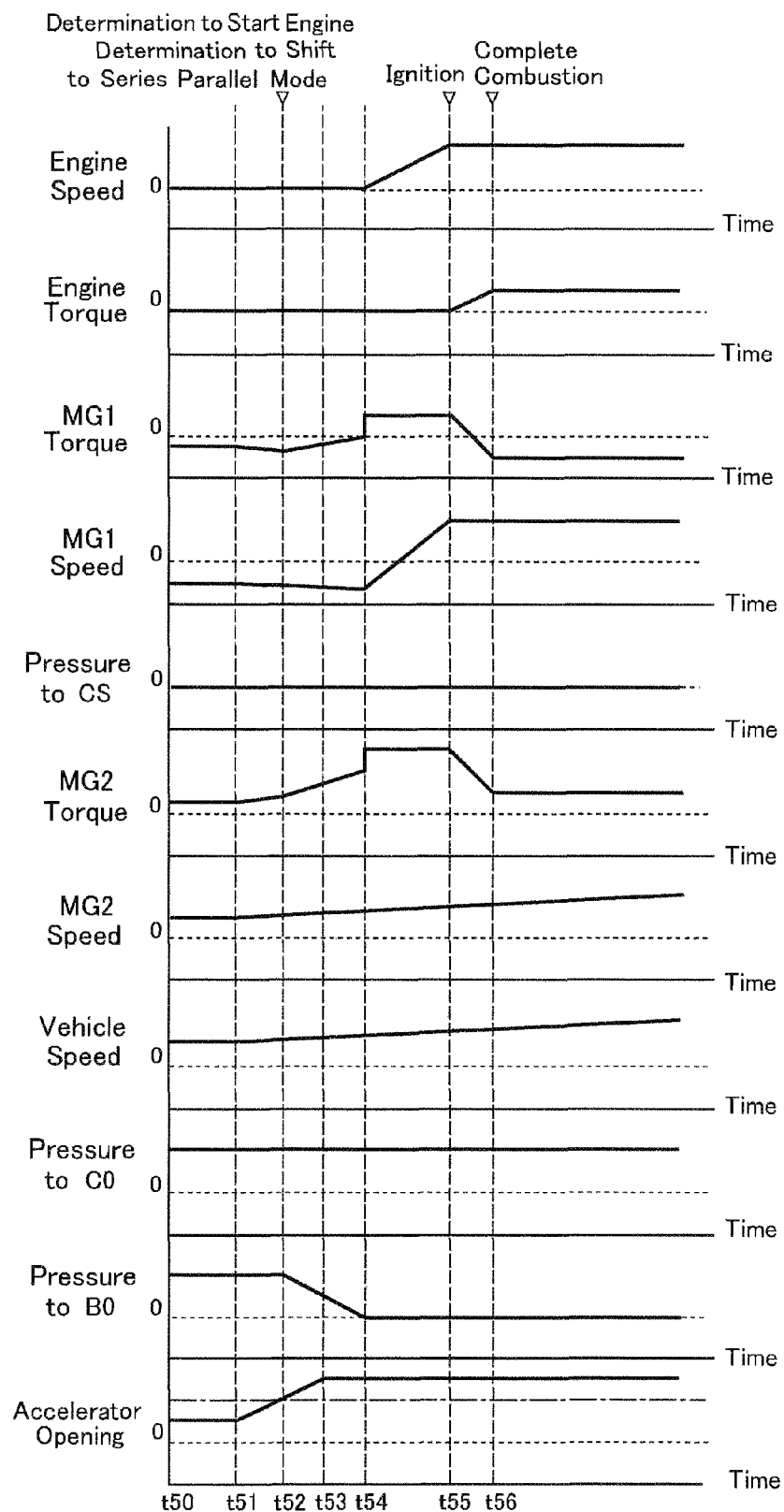
FIG. 13 is a time chart showing temporal changes in the condition of the vehicle during shifting the operating mode from the dual-motor mode to the series parallel mode.

FIG. 13 shows temporal changes in the conditions of the vehicle during shifting the operating mode from the dual-motor mode of the EV mode to the variable mode of the series parallel mode by the procedures shown in FIG. 1.

At point t50, the vehicle is propelled in the dual-motor mode. In this situation, the input clutch C0 and the brake B0 are engaged, the series clutch CS is disengaged, and the vehicle is powered by both of the first motor 4 and the second motor 16 while stopping the engine 1.

At point t51, the accelerator pedal is depressed by the driver to increase an opening degree of the accelerator so that the counter torque of the first motor 4 and the forward torque of the second motor 16 are increased from point t51. Then, at point t52, the above-explained operating point of the vehicle enters into the engine starting region of the map shown in FIG. 7 and hence a determination to start the engine 1 is made at point t52. At point t52, a determination to shift to the series parallel mode is also made with reference to the map shown in FIG. 6.

In this case, the operating mode is shifted from the dual-motor mode to the series parallel mode by engaging the series clutch CS while disengaging the brake B0. To this end, hydraulic pressures applied to the brake B0 are reduced gradually from point t52, and the counter torque of the first motor 4 is also reduced from point t52.

The forward torque of the second motor 16 is increased from point t52 to compensate such reduction in the output torque of the first motor 4. The opening degree of the accelerator is maintained to a constant degree at point t53, and the brake B0 is brought into complete disengagement at point t54. In this situation, since the output torque of the second motor 16 is increased while engaging the input clutch C0, the output torque of the first motor 4 is reduced but the speed of the counter rotation of the first motor 4 is increased.

After disengaging the brake B0, the engine 1 is started by rotating the crankshaft 2 of the engine 1 by the forward torque of the first motor 4 while increasing the forward torque of the second motor 16 to increase the vehicle speed. Consequently, a rotational direction of the first motor 4 is reversed from the counter direction to the forward direction.

When the startup of the engine 1 is completed at point t55, the engine 1 is ignited. Meanwhile, the output torque of the first motor 4 is gradually reduced to be reversed to the counter torque and the output torque of the second motor 16 is reduced gradually until a complete combustion of the engine 1 is achieved at point t56. Consequently, the shifting operation to the series parallel mode is completed.

Thus, in the case of shifting the operating mode from the dual-motor mode to the variable mode, the operating mode can be shifted to the variable mode by disengaging the brake B0 before starting the engine 1, and the input clutch C0 and the series clutch CS will not be engaged and disengaged after starting the engine 1. In this case, therefore, frequency of engagement operation and disengagement operation of the clutches and the brake after starting the engine 1 can be reduced.

In addition, the operating mode may also be shifted from the dual-motor mode to the variable mode. In this case, the series clutch CS is engaged after starting the engine 1 by the above-explained procedures. Here, the routine shown in FIG. 1 may be executed not only in the forward propulsion but also in the reverse propulsion.

Figure 14:
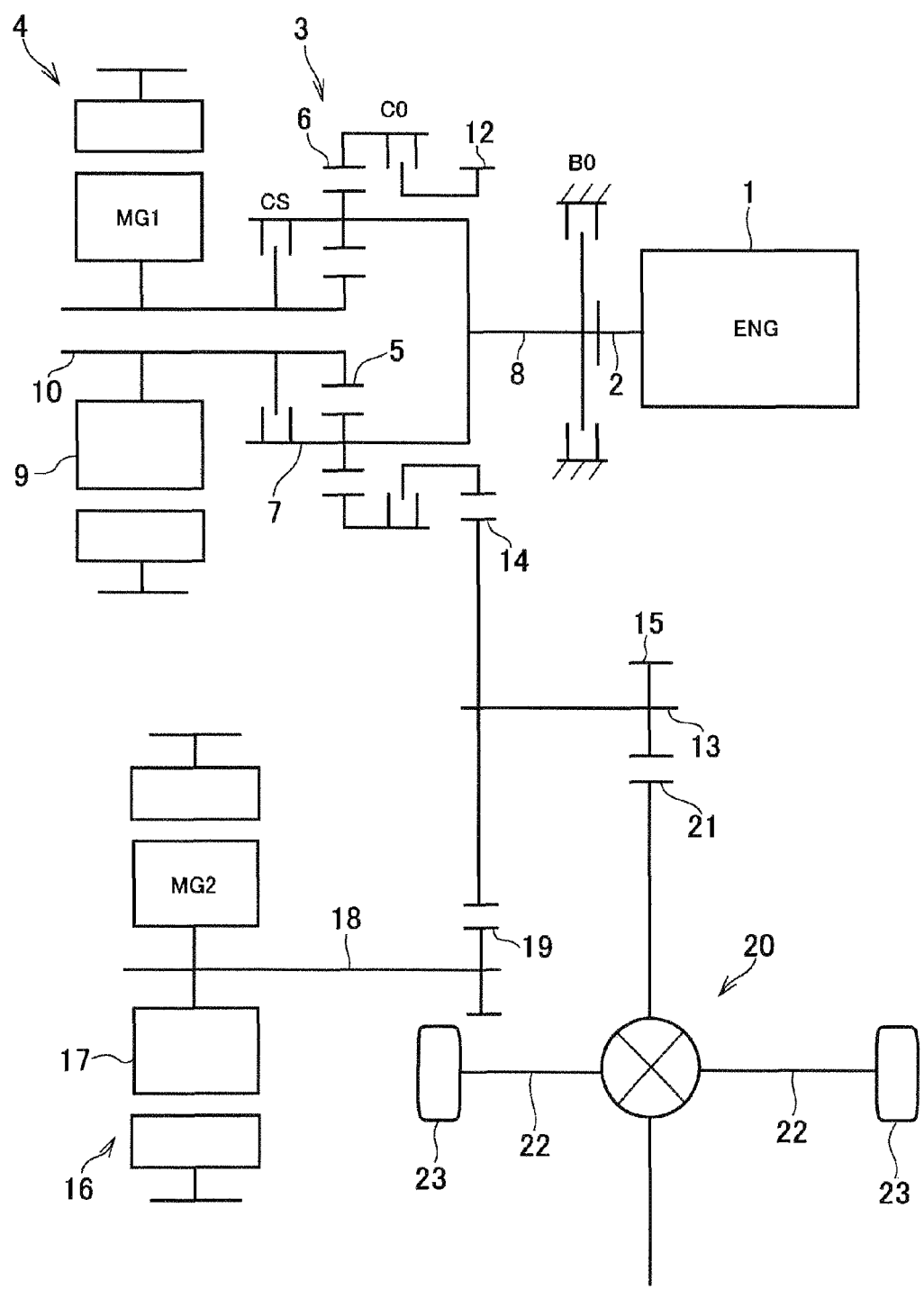
FIG. 14 is a schematic illustration showing another example of the vehicle to which the control system according to the present application is applied.

Turning to FIG. 14, there is shown another example of the vehicle to which the control system according to the present application is applied. In order to selectively transmit torque from the engine 1 to the output gear 12 through the power distribution device 3, the input clutch C0 may also be disposed between the ring gear 6 and the output gear 12. Likewise, in order to selectively transmit a torque from the engine 1 to the first motor 4, the series clutch CS may also be disposed between the carrier 7 and the first rotor shaft 10. The remaining structures are similar to those of the drive unit shown in FIG. 2, and detailed explanations for the common elements will be omitted by allotting common reference numerals thereto.

In the vehicle according to another example, the operating mode may also be selected from the above-explained EV mode and HV mode by manipulating the input clutch C0, the series clutch CS and the brake B0. Specifically, in the EV mode in which the vehicle is powered by the second motor 16, all of the input clutch C0, the series clutch CS and the brake B0 are disengaged. Consequently, the output gear 12 is disconnected from the ring gear 6 of the power distribution device 3 so that the sun gear 5, the ring gear 6 and the carrier 7 are prevented from being rotated. In this situation, if the input clutch C0 is engaged, the ring gear 6 is rotated together with the output gear 12, and since the ring gear 7 is halted together with the engine 1, the sun gear 5 and the first motor 4 connected thereto are rotated in the counter direction. As a result, the operating mode is shifted from the disconnecting mode to the connecting mode. A status of the power distribution device 3 in the connecting mode is indicated in a nomographic diagram shown in FIG. 15a. In this situation, the carrier 7 is allowed to establish a reaction torque against an output torque of the first motor 4 by engaging the brake B0 to halt the input shaft 8 and the carrier 7. Consequently, the operating mode is shifted to the dual-motor mode in which the vehicle is powered by the first motor 4 rotated in the counter direction and the second motor 16 rotated in the forward direction. FIG. 15b shows a status of the power distribution device 3 of the vehicle according to another example during reverse propulsion in the connecting mode. As can be seen from FIG. 15b, although positions of the input clutch C0 and the series clutch CS are altered, rotational directions of the sun gear 5, the ring gear 6 and the carrier 7 are similar to those in the nomographic diagram shown in FIG. 5b.

As described, in the series mode, the first motor 4 is operated as a generator by rotating the first motor 4 by the engine 1 while engaging the series clutch CS, and the second motor 16 is operated as a motor by the electric power generated by the first motor 4 to propel the vehicle. In the vehicle according to another example, the sun gear 5 is connected to the carrier 7 by the series clutch CS so that the power distribution device 3 is rotated integrally, and consequently the first motor 4 is rotated by the engine 1 to generate an electric power. In this situation, however, the input clutch C0 is in disengagement to disconnect the ring gear 6 from the output gear 12 and hence the output torque of the engine 1 will not be applied to the output gear 12. An operating state of the power distribution device 3 of the vehicle according to another example in the series mode is shown in FIG. 15c, and as shown in FIG. 15c, the sun gear 5, the ring gear 6 and the carrier 7 are rotated at a same speed. In the series mode, the vehicle is propelled backwardly by rotating the second motor 16 in reverse by the electric power generated by the first motor 4 operated by the engine 1.

In the variable mode of the series parallel mode, the vehicle according to another example is propelled in the forward direction by controlling a rotational speed of the engine 1 by the first motor 4 while operating the second motor 16 by the electric power generated by the first motor 4. A status of the power distribution device 3 of the vehicle according to another example in the variable mode of the series parallel mode during forward propulsion is indicated in a nomographic diagram shown in FIG. 15d. As can be seen from FIG. 15d, although positions of the input clutch C0 and the series clutch CS are altered, rotational directions of the sun gear 5, the ring gear 6 and the carrier 7 are similar to those in the nomographic diagram shown in FIG. 5e. In the series parallel mode, the vehicle according to another example is propelled in reverse by rotating the first motor 4 in the forward direction by the engine 1 to generate an electric power, and by rotating the second motor 16 in reverse by the electric power generated by the first motor 4 while engaging the input clutch C0.

During forward propulsion in the series parallel mode, the fixed mode is also established in the vehicle according to another example by engaging the input clutch C0 and the series clutch CS. FIG. 15e shows an operating state of the power distribution device 3 of the vehicle according to another example in the fixed mode. In this case, since the input clutch C0 and the series clutch CS are engaged, the carrier 7 is connected to the sun gear 5 so that the power distribution device 3 is rotated integrally. As can be seen from FIG. 15e, although positions of the input clutch C0 and the series clutch CS are altered, rotational directions of the sun gear 5, the ring gear 6 and the carrier 7 are similar to those in the nomographic diagram shown in FIG. 5f.

Although the above exemplary embodiments of the present application have been described, it will be understood by those skilled in the art that the present application should not be limited to the described exemplary embodiments, and various changes and modifications can be made within the spirit and scope of the present application.

What is claimed is:

1. A driving force control system for a hybrid vehicle comprising:
    an engine;
    a first motor having a generating function;
    a power distribution device that performs a differential action among an input element to which a torque of the engine is applied, a reaction element to which a torque of the first motor is applied, and an output element;
    an output member to which a torque is delivered from the output element;
    a first engagement device that selectively allows torque transmission between the engine and the first motor;
    a second engagement device that selectively allows torque transmission between the engine and the output member through the power distribution device; and
    a second motor that is activated by an electric power generated by the first motor to generate a drive torque to propel the vehicle,
    wherein an operating mode can be selected at least from: a series mode in which the first engagement device is engaged, the first motor is rotated by the engine to generate electric power, and the second motor is operated by the electric power generate by the first motor to propel the vehicle; and a series parallel mode in which at least the second engagement device is engaged, and the vehicle is powered by the engine and the second motor,
    wherein the driving force control system comprises a controller that is configured to:
    control the engine, the first engagement device and the second engagement device;
    determine whether or not the engine is required to be started;
    determine the operating mode to be established in a case that the engine is required to be started;
    engage at least one of the first engagement device and the second engagement device to achieve the determined operating mode; and
    start the engine while engaging said one of the first engagement device and the second engagement device.

2. The driving force control system for a hybrid vehicle as claimed in claim 1, wherein the controller is further configured to start the engine while engaging the first engagement device in a case that the operating mode is to be shifted to the series mode after starting the engine.

3. The driving force control system for a hybrid vehicle as claimed in claim 1, wherein the controller is further configured to start the engine while engaging the second engagement device in a case that the operating mode is to be shifted to the series parallel mode after starting the engine.

4. The driving force control system for a hybrid vehicle as claimed in claim 1, further comprising:
    a third engagement device that selectively halt a rotation of an output shaft of the engine;
    wherein the operating mode can be further selected from a dual-motor mode in which the vehicle is powered by the first motor and the second motor while engaging the third engagement device.

5. The driving force control system for a hybrid vehicle as claimed in claim 4,
    wherein the third engagement device, the second engagement device, the power distribution device, the first motor and the first engagement device are arranged in order from the engine side and coaxially with the output shaft of the engine, and
    wherein the second motor is arranged in such a manner that a rotor shaft thereof extends parallel to the output shaft of the engine.

6. The driving force control system for a hybrid vehicle as claimed in claim 5,
    wherein a counter shaft extends between and in parallel to the output shaft of the engine and the rotor shaft of the second motor,
    wherein a diametrically-larger gear to which torques of the output member and the second motor is applied, and a diametrically-smaller gear that outputs a drive torque are fitted onto the counter shaft.

* * * * *